United States Patent [19]

Tomkó et al.

[11] Patent Number: 4,499,110

[45] Date of Patent: Feb. 12, 1985

[54] PHOSPHOROUS-NITROFEROUS SOLID FODDER COMPOSITION AND PROCESS FOR ITS PRODUCTION

[76] Inventors: Béla Tomkó, 27, Páskomliget ut, 1156 Budapest; Géza Márai, 1/A, Nyisztor tér, 2100 Gödöllo; Béla Karácsonyi, 18, Práter utca, 1082 Budapest, all of Hungary

[21] Appl. No.: 560,270

[22] Filed: Dec. 12, 1983

Related U.S. Application Data

[63] Continuation of Ser. No. 435,127, Oct. 18, 1982, abandoned, which is a continuation of Ser. No. 137,506, Apr. 4, 1980, abandoned.

[30] Foreign Application Priority Data

Apr. 6, 1979 [HU] Hungary ............................ TO 1099

[51] Int. Cl.³ ................................................ A23K 1/22
[52] U.S. Cl. ...................................... 426/69; 426/623; 426/630; 426/636; 426/807
[58] Field of Search ..................... 426/69, 72, 74, 623, 426/630, 635, 658, 807

[56] References Cited

U.S. PATENT DOCUMENTS

| | | | |
|---|---|---|---|
| 2,965,488 | 12/1960 | Belasco | 426/69 |
| 3,420,672 | 1/1969 | Appleman | 426/658 |
| 3,878,304 | 4/1975 | Moore | 426/807 X |
| 3,901,976 | 8/1975 | Roth et al. | 426/69 |
| 3,988,483 | 10/1976 | Deyoe et al. | 426/623 |

*Primary Examiner*—R. B. Penland
*Attorney, Agent, or Firm*—Gabriel P. Katona

[57] ABSTRACT

An improved fodder composition resulting in the slow release of phosphorous comprising a combination of a phosphorous component, a nitrogen component and a starch and a process for the preparation thereof.

2 Claims, No Drawings

PHOSPHOROUS-NITROFEROUS SOLID FODDER COMPOSITION AND PROCESS FOR ITS PRODUCTION

This is a continuing application of application Ser. No. 435,127, filed on Oct. 18, 1982 which is continuation of Ser. No. 137,506, filed on Apr. 4, 1980 now both abandoned.

The invention relates to a phosphorous-nitrogen containing solid fodder composition and to a process for its production. The produced fodder composition has improved biological properties as compared to those of hitherto known ones.

In the production of fodder compositions the results of recent biological investigations are taken into consideration to an even increasing extent. The aim is to produce fodder compositions adapted to the physiological requirements of the animals. Another significant endeavour is the more economic utilization of the available fodder components, i.e. to provide for their full exploitation from physiological point of view, on the one hand, and for the production and practical use of fodder compositions by a simple technology as possible as well on the other hand. The compatibility of the produced new fodder compositions with the traditional fodder components is also a very important requirement.

It is well known that in foddering the introduction of phosphorus additive in a suitable form is of utmost importance. In the fodder the phosphorus is used in the form of so-called fodder phosphates, such as dicalcium phosphate, monocalcium phosphate or sodium phosphate, and in the form of other mineral phosphates, respectively.

In the printed copy of application paper No. 2 803 246 published in the German Federal Republic /DOS/ the application of a fodder composition of starch-phosphoric acid base is suggested which has—as compared to the traditional fodder phosphates—several advantageous properties, especially with respect to the physiological utilization of phosphorus. In addition to the good biological utilization of products based on starch-phosphoric acid in the living organism, an important task is to achieve a retarded, or even controlled phosphorus absorption. The controlled absorption of phosphorus in the living organism is one of the preconditions of highly efficient metabolic processes.

It was recognized that the controlled /retarded/ absorption of phosphorus in living organism which is physiologically very important can be achieved by a composition comprising starch-phosphoric acid and urea. The urea exerts its effect not recognized until now presumably by an interaction with other components of the composition.

The utilization of urea in foddering is in connection with the fact that a part of the protein demand of ruminants is intended to be replaced for economic reasons by a nitrogen containing fodder of non-protein character. Urea is suitable to some extent to replace natural proteins. The use of urea is especially significant from economic point of view and efforts are made to use the urea substituting for protein in even higher proportion in animal foddering. The sudden release of urea in the living organism, in the rumen of ruminants, may have serious consequences due to the liberation of ammonia, therefore the retarded or controlled absorption of urea is striven after by various methods.

It was also recognized that the controlled absorption of urea in the living organism occures unexpectedly more advantageously in the presence of phosphoric acid so that in foddering, the proportion of urea may be increased at the expense of protein.

The purpose of the invention is the control of the absorption of phosphoric acid, on the one hand, and of urea, on the other hand in living organism, by manufacturing such a composition which meets the above demands.

The composition comprising phosphoric acid, urea and starch according to the invention may be characterized in that in aqueous medium the releasing of phosphoric acid both in vitro and in vivo is at least partly retarded. This retarded release of phosphoric acid may be attributed to the interaction of components, and in this interaction presumably the starch plays also a part. The development of retarded or controlled absorbing property may be influenced in case of the composition according to the invention e.g. by the conditions of the production process and by the proportions of components and may be varied always in accordance with the demands of the animal organism. The interaction between the individual components of the composition occurs expediently under heat effect.

On preparing the composition the phosphorus is present in the form of phosphoric acid, whereas the starch is in the form of maize starch, potato starch, barley starch, wheat starch or rice starch, of a starch decomposition product, starch derivative or of a material containing the latter. The outside form of the composition is expediently granular or granulated and this granular form is developed at the production of the composition.

The solid composition comprising phosphoric acid, urea and starch may be produced by various processes. The common feature of these processes consists in that from the phosphoric acid, urea and starch a dispersed system of miscible state, such as a paste or a melt is produced, necessarily by adding water. This system is held at a temperature within the range of 40°–120° C. and occasionally before and after the heat transmission. It is cold or hot formed, and other fodder additive or auxiliary materials promoting the granulation are added, if required. As dispersion medium, phosphoric acid, aqueous phosphoric acid, solution of phosphoric acid and urea, or urea melt containing phosphoric acid may be used. The dispersed system is produced from the components expediently by intensive agitation. A part of the water or the entire water quantity necessary for the production of the composition may be introduced by aqueous phosphoric acid or by aqueous solution of urea. The urea may be used also in the form of non-crystallized concentrated solution developed in the urea-synthesis. The finished composition may be formed by granulation, extrusion or by any other known forming process. The period of heat treatment is between 1 minute and 24 hours.

According to an embodiment, to 1 part of water such a quantity of phosphoric acid is added that the phosphorus concentration of the obtained aqueous solution should amount to 0.08–0.32 part, and then, to the aqueous phosphoric acid solution urea is added until the formation of a saturated urea-solution, in the obtained solution at least 1.3 parts of starch is smoothly dispersed and the solution is then held at a temperature in the range of 40°–120° C., and cold or hot formed, if required.

According to another embodiment 1 part of phosphoric acid of 1.05–1.7 specific weight is mixed with urea and starch until the formation of a pasty mass, then held at a temperature of 40°–120° C. The heat treatment of this composition is carried out for 1 minute to 24 hours, depending on the selected temperature.

The third embodiment of the production process of the composition may be characterized in that 1 part of urea is dissolved at a temperature above 132.7° C., then, calculated on 100% phosphoric acid, 0.15–0.25 part of phosphoric acid is added to the melt in diluted of concentrated form, finally 0.1–1 part of starch is dispersed into the melt. The mixing is carried out as long as the melt will be homogeneous. It is then formed either hot or in cooled state, either by granulation or by extrusion. If required, mineral substances, products containing macroelements, microelements or trace elements may be added to the urea melt.

The advantageous properties of the composition produced according to the invention may be summarized as follows:

1. The composition is a product comprising the disponible, fully absorbable phosphorus source indispensable with the fodder, the urea used for replacing the natural protein, as well as the starch. Each component of the combination is a valuable feed but, as compared to the properties of the individual components, the composition has a surplus effect in foddering, to be attributed to the interaction of components. The interaction provides presumably for the achievement of advantages hitherto not realizable and for the better adaptation of the fodder composition to the physiological demands of the animal organism.

2. The equilibrium ratio of urea and phosphorus in the composition renders possible a control of the pH-value in the rumen. The proportion of urea in the fodder may be thus increased without any toxic property exerted on the living organism. In other words, the possibility of increasing the proportion of urea at the expense of protein is presumably given if it is compensated with the phosphoric acid component present in the composition. The physiological processes being more closely interpreted, by adjusting the optimum pH-value of 6.3–6.5 of the rumen, the activity of the urease enzyme decreases, the absorption of the developed ammonia reduces, the rate of fatty acid absorption increases, the living medium of bacteria utilizing the ammonia will be advantageous, resulting finally in a more intensive ammonia utilization. The urea component of the composition will better resist the effect of urease enzyme so that the degree of ammonia formation will be restrained and becomes regulable.

3. The increased phosphorus demand necessary for the toxicity-free utilization of urea in the living organism is met in suitable degree and in time suitable distribution by the phosphoric acid of the composition. The phosphoric acid component of the composition presumably dissolves already in the rumen in suitable degree at the hydrolysis of urea, the advantage of which consists, in addition to the provision for an optimum pH-value, in that the phosphorus is immediately utilized for the synthesis of bacterium proteins, for the formation of biologically active materials, e.g. enzymes. This process may not take place in case of the known fodder phosphates since their primary dissolution and utilization point is the true stomach, therefore for the utilization of an increased urea quantity, no well utilizable, disponible phosphorus source was available prior to the manufacture of the present composition.

4. The phosphorus absorption of controlled degree of the composition produced according to the invention in the living organism is an important feature. The phosphorus component of the composition provides by itself for a good solubility, absorption, retention for the phosphorus source and is more advantageous than the use of costumary fodder phosphates. The solution and full utilization of phosphorus represent advantages but it should be still added thereto that in the living organism the phosphorus getting through the absorbing epiderm /ileum, stomach or true stomach/ by active transport becomes successively free, thus the proper phosphorus source is available at a rate corresponding to the formation, and formation capacity, respectively, of phosphate-bearing proteins of complex chelate bond responsible for the active transport. Since the period and extent of controlled progressive release of phosphorus are controllable according to the physiological requirements, the complex protein participating in the active transport is not loaded and the utilization of phosphorus becomes more effective.

5. The composition in its general effect improves the utilization of fodders, as compared to the known fodder compositions, so that its use in foddering offers advantages with respect also to the economic points of view.

The various production methods of the composition according to the invention will be described in the following examples, noting, however, that in addition to the examples other embodiments of the process for the production of the novel composition are also possible.

EXAMPLE 1

1 part of water is mixed with 1 part of phosphoric acid and the phosphorus content of the solution is adjusted to 0.32 part. In the solution obtained in this way 1 part of urea is dissolved, then 1.5 parts of maize starch is admixed. The mixture is heated to 80° C., then formed and dried.

In aqueous medium the phosphoric acid releases from the product in 30 minutes /titrimetrically measured/.

EXAMPLE 2

1 part of water is mixed with 0.5 part of phosphoric acid, and the phosphorus content of the solution is adjusted to 0.105 part. Then, while heating to 60° C., 0.5 part of urea is dissolved in the solution. The solution is stirred until the dissolution of urea, then 1.5 parts of wheat starch is added. The mixture is dried and formed.

In aqueous medium the phosphoric acid releases from the composition in 20 minutes /titrimetrically measured/.

EXAMPLE 3

1 part of phosphoric acid of 1.254 specific weight is mixed with 2 parts of urea and 2.5 parts of maize starch, then the mixture is heated to 80° C., formed and dried.

In aqueous medium the phosphoric acid releases from the composition in 45 minutes.

EXAMPLE 4

1 part of phosphoric acid of 1.335 specific weight is mixed with 3 parts of urea and 3.2 parts of maize starch, then the mixture is extruded while being held at 100° C., and finally it is dried.

In aqueous medium the phosphoric acid releases from the composition in 2 hours and 45 minutes.

EXAMPLE 5

1 part of urea is melted at 133° C., then 0.2 parts of concentrated phosphoric acid /85-90%/ is added to the melt and smoothly mixed, then 0.8 part of maize starch is added. After the uniform dispersion the material is granulated in cooled state.

In aqueous medium the phosphoric acid releases from the composition in 3 hours.

EXAMPLE 6

1 part of phosphoric acid of 1.33 specific weight is mixed with 3 parts of urea and 0.2 part of the mixture of 1:1 ratio of sodium sulfate and cobalt sulfate and then 2 parts of maize starch are added. The mixture is heated to 100° C., then formed and dried.

In aqueous medium the phosphoric acid releases from the composition in 2 hours and 30 minutes.

1 part of water is mixed with 0.8 part of phosphoric acid and to the solution obtained in this way 0.6 part of urea is dissolved. Then 1.5 parts of barley starch are admixed. The product is allowed to stand in humid state for 72 hours, then formed and dried. In aqueous medium the phosphoric acid releases delayed from the obtained composition.

What we claim is:

1. Process for the production of a phosphorous-nitrogen containing solid fodder composition, consisting essentially of: adding to one part by weight of the urea, 0.15-0.25 part by weight of diluted or conc. $H_3PO_4$ at a temperature above 132.7° C. to form a melt; dispersing in the melt 0.1-1.0 part by weight of a uniform dispersion of starch; extruding or granulating the melt hot or cold, and adding other fodder components to the melt, whereby release of phosphoric acid and urea in living organisms is controlled.

2. A process for the production of a solid fodder composition consisting of starch, $H_3PO_4$ and urea, which consists essentially of mixing with intensive agitation one part of $H_3PO_4$ of 1.05-1.70 specific gravity, 0.5-3 parts urea and 1.5-3.2 parts starch to form a paste or melt; holding the paste or melt at a temperature in the range of 40°-120° C. for 1 minute to 24 hours, and granulating or extruding the paste or melt in cold or hot state, whereby release of phosphoric acid and urea in living organism is controlled.

* * * * *